(12) United States Patent
Lignon

(10) Patent No.: US 8,342,024 B2
(45) Date of Patent: Jan. 1, 2013

(54) GYROSCOPIC MEASUREMENT BY A VIBRATORY GYROSCOPE

(75) Inventor: Christian Lignon, Paris (FR)

(73) Assignee: Sagem Defense Securite, Paris (FR)

( * ) Notice: Subject to any disclaimer, the term of this patent is extended or adjusted under 35 U.S.C. 154(b) by 470 days.

(21) Appl. No.: 12/581,670

(22) Filed: Oct. 19, 2009

(65) Prior Publication Data

US 2010/0095771 A1    Apr. 22, 2010

(30) Foreign Application Priority Data

Oct. 20, 2008   (FR) ...................................... 08 57120

(51) Int. Cl.
*G01C 19/56*     (2006.01)
(52) U.S. Cl. .................................................... 73/504.12
(58) Field of Classification Search ................ 73/504.12
See application file for complete search history.

(56) References Cited

U.S. PATENT DOCUMENTS

| | | | |
|---|---|---|---|
| 6,367,326 B1 * | 4/2002 | Okada ......................... | 73/504.12 |
| 6,701,786 B2 * | 3/2004 | Hulsing, II ................. | 73/514.02 |
| 6,925,401 B2 * | 8/2005 | Kameya ...................... | 702/87 |
| 7,281,426 B1 * | 10/2007 | Chikovani et al. ......... | 73/504.13 |
| 7,325,454 B2 * | 2/2008 | Saito et al. ................. | 73/511 |
| 7,644,604 B2 * | 1/2010 | Hotelling et al. .......... | 73/1.77 |
| 7,814,793 B2 * | 10/2010 | Sato ........................... | 73/504.12 |

FOREIGN PATENT DOCUMENTS

| | | |
|---|---|---|
| EP | 1 491 856 A1 | 12/2004 |
| EP | 1 571 417 A2 | 9/2005 |
| FR | 2 755 227 | 10/1996 |
| FR | 2 904 870 | 8/2006 |

OTHER PUBLICATIONS

French Search Report from corresponding French Patent Application No. FR 0857120 Report Dated Jun. 8, 2009.
Shkel, Andrei M., "Type I and Type II Micromachined Vibratory Gyroscopes", IEEE/ION, 2006, pp. 586-593.

* cited by examiner

*Primary Examiner* — Hezron E Williams
*Assistant Examiner* — Gregory J Redmann
(74) *Attorney, Agent, or Firm* — Miller, Matthias & Hull LLP

(57) ABSTRACT

A gyroscopic system supplies measurements on the basis of a vibratory gyroscope, which vibrates in a first vibration position and supplies a measurement signal. A periodic command signal is applied to it over a time period to cause the vibration geometrical position to turn a first way during one part of the time period, causing a change in accordance with a first speed profile from the first position to a second position; and to cause the vibration geometrical position to turn a second way opposite the first way during the other part of the time period, causing a change in accordance with a second speed profile from the second position to the first position. The speed profiles indicate a speed variation of the change of position. The measurements supplied by the system are then based on a corrected signal obtained by subtracting the command signal from the measurement signal supplied by the gyroscope.

13 Claims, 4 Drawing Sheets

GYROSCOPIC MEASUREMENT BY A VIBRATORY GYROSCOPE

CROSS-REFERENCE TO RELATED APPLICATIONS

This application claims priority under the Paris Convention to French Patent Application No. 08 57120, filed on Oct. 20, 2008.

FIELD OF THE DISCLOSURE

The present invention relates to vibratory gyroscopes the principle of which is based on the Coriolis effect and it relates more particularly to the accuracy of the measurements supplied by this type of gyroscope.

BACKGROUND OF THE DISCLOSURE

Such vibratory gyroscopes are conventionally used in inertial navigation systems, as is the case, for example, for a gyroscopic compass that is adapted to supply an angle measurement relative to a reference direction which is that of the geographical North (Heading).

Asymmetrical Coriolis Vibratory Gyroscopes (CVG), for example of the Hemispherical Resonance Gyroscope (HRG) type, more generally referred to as of type I, such as those described in the document 'Type I and Type II micromachined vibratory gyroscopes' by Andrei M. Shkel, pages 586-593, IEEE/ION (Institute of Electrical and Electronics Engineers/Institute of Navigation', PLANS 2006, San Diego, Calif., USA), operate in open loop mode and measure an absolute rotation angle on the basis of a measurement of an angle representing the vibration geometrical position of the gyroscope relative to measuring electrodes.

Such a gyroscope can also be used in closed loop mode by controlling the vibration geometrical position by commanding precession, as described in particular in the document FR 2 755 227.

In this case, the vibration geometrical position of the gyroscope is maintained in a fixed position, and the measurement is deduced from the command input that it is necessary to apply to the gyroscope to maintain it in that fixed vibration geometrical position. This type of operation is also referred to as 'gyrometer looping'. The values supplied by the physical measurement then no longer correspond to an angle but to a rotation speed.

Whether used in open loop mode or in closed loop mode, the measurements supplied by these vibratory gyroscopes can be affected by errors that are essentially a function of the position of the vibration relative to the measuring electrodes. These errors are therefore variable as a function of the vibration geometrical position, and have the effect of degrading the level of accuracy of the values measured in this way. There is therefore benefit in seeking to reduce these errors in order to improve the performance of this type of gyroscope.

SUMMARY OF THE DISCLOSURE

The present invention improves on this situation.

A first aspect of the present invention proposes a method of gyroscopic measurements supplied by a gyroscopic system including a vibratory gyroscope;

said gyroscope vibrating in an initial first vibration geometrical position and supplying a measurement signal;

wherein there is applied to the vibratory gyroscope over a period of time a periodic command signal adapted:
to cause the vibration geometrical position to turn a first way during one part of the time period, causing a change, in accordance with a first speed profile, of the position of the vibration of said gyroscope from the first vibration geometrical position to a second vibration geometrical position; and
to cause the vibration geometrical position to turn a second way opposite the first way during the other part of the time period, causing a change in accordance with a second speed profile of the position of the vibration of said gyroscope from the second vibration geometrical position to the first vibration geometrical position;
the command signal having a zero average over the time period, and the first and second speed profiles indicating a speed variation of the change of vibration geometrical position as a function of time; and
wherein the measurements supplied by the gyroscopic system are based on a corrected signal representing a variation of vibration geometrical position values and obtained by subtracting the command signal from the measurement signal supplied by the gyroscope.

In one embodiment of the present invention, a gyroscopic system includes a vibratory gyroscope that supplies a measurement signal representing a variation of its vibration geometrical position as a function of time.

The expression 'vibration geometrical position', referring to a gyroscope, denotes the position of the stationary wave. FIG. 1-A shows such a stationary wave.

The wave illustrated here has four nodes a, b, c, d and four antinodes e, f, g, h around the periphery of a hemispherical resonator. These four antinodes and four nodes alternate and are uniformly spaced by 45°. The nodes are points on the stationary wave where the displacement is minimal and the antinodes are points on the stationary wave where the displacement is maximal. The operation of the hemispherical resonator gyroscope requires accurate tracking of the movement of the stationary wave, which in turn requires the exact location of the nodes and the antinodes to be determined.

The position of this stationary wave, or the vibration geometrical position of the gyroscope, can be turned so that the nodes and the antinodes shown are not situated as shown, but offset.

This vibratory gyroscope is advantageously subjected over a period of time to a periodic command signal that is adapted to cause the vibration geometrical position of the gyroscope to turn a first way during one part of the time period and according to a first speed profile and then the opposite way according to a second speed profile. The measurement signal supplied by the vibratory gyroscope is thus based on measurements effected in different vibration geometrical positions, with the result that the measurement errors that are linked to the vibration geometrical positions of the vibratory gyroscope can be cancelled out or averaged. Furthermore, it is necessary to subtract from this measurement signal supplied by the vibratory gyroscope the periodic command signal applied to it to obtain in the end corrected gyroscopic measurements.

The periodic command signal can correspond, over a period of time, to a change of the vibration geometrical position a first way from the first to the second vibration geometrical position, this change of vibration geometrical position being effected according to the first speed profile, and then a change of the vibration geometrical position a second way from the second to the first vibration geometrical position, this change of position being effected according to the second speed profile. Each of these speed profiles indicates a variation as a function of time of the rotation speed that is applied at the vibration geometrical position via the command signal in one embodiment of the present invention.

In one embodiment of the present invention, the second speed profile is the reverse of the first speed profile as a function of time. Thus the command signal applied is symmetrical on either side of the middle of its time period.

In one embodiment, the first and second parts of the time period can be identical.

In one embodiment, the measurement signal from the gyroscope and the command signal are expressed like the measurements supplied by the gyroscopic system, either as angle values or as angular speed values. In this case, it is advantageously not necessary to effect any signal integration before proceeding to subtract the command signal from the measurement signal.

Thanks to these features, the measurements supplied by the gyroscopic system including a vibratory gyroscope can advantageously be based on a measurement signal supplied by the vibratory gyroscope the vibration geometrical position of which varies according to the first and second speed profiles.

In one embodiment of the present invention, the measurements supplied by the gyroscopic system correspond to angular speed values, each angular speed value resulting from the division of a difference between two vibration geometrical position values of the corrected signal separated by an integer number of time periods by a time value corresponding to the integer number of time periods.

By proceeding in this way, gyroscopic measurement values can be supplied that are not only corrected for errors relating to vibration geometrical positions of the vibratory gyroscope, but also not impacted by the errors relating to the differences between the scale factors of the measurement signal and the command signal over a complete period. Over less than an entire period, by subtracting one signal from another in this way, the resulting signal can be affected by an error, referred to as a scale factor (or precession) error. In the present context, this scale factor error can correspond to the fact that the corrected signal still includes residues of the command signal or still includes a residual command signal.

By establishing the difference between two vibration geometrical positions of the vibratory gyroscope that are separated in time by an integer number of periods of the command signal it is possible to cancel out errors relating to the scale factor. Then, by dividing this difference between vibration geometrical positions by the time period separating those two positions, an angular speed is then obtained that is free of scale factor errors.

In one embodiment of the present invention, the measurements supplied by the gyroscopic system are further obtained by low-pass filtering of the corrected signal.

By filtering the corrected signal in this way, it is also possible to avoid scale factor errors that can affect the corrected signal. If the corrected signal is considered over a relatively long time period, the residual command signal can then be considered as a signal at a high frequency relative to the corrected signal, and can therefore be filtered by a low-pass filter. By a relatively long time period is meant a time period that corresponds to 20 or more time periods of the command signal.

In the above context, the periodic signal can thus advantageously be applied during a time interval sufficiently long to consider the command signal as a high-frequency signal relative to the measurement signal from the vibratory gyroscope, before supplying the measurements effected by the gyroscopic system.

Then, once low-pass filtering has been applied, the gyroscopic measurements conforming to one embodiment can be supplied on the basis of the filtered corrected signal, taking into consideration a sliding time window whose width is at least equal to the time interval referred to above.

In this context, it is possible to wait for a minimum time period before supplying the measurements effected by the gyroscopic system, in order to be able to filter a residual command signal treated as a high-frequency signal of the corrected signal. This minimum time period is advantageously defined as a function of the periodicity of the command signal applied. It is necessary to determine a minimum time period such that the command signal is considered a high-frequency signal relative to the measurement signal supplied by the vibratory gyroscope.

The period and the constant speed of the command signal can be determined so that the first and second vibration geometrical positions of the vibratory gyroscope are separated by $2\pi/kN$ radians, where N is a vibratory gyroscope vibration frequency mode, and where k is a positive integer number determined as a function of the order of the errors to be corrected.

By scanning in this way an angular amplitude for the vibration geometrical position of the vibratory gyroscope, it is possible to correct different orders of error relative to the vibration geometrical position of the gyroscope, since any such error substantially satisfies the following equation, in which $\theta$ is a vibration geometrical position value and n is an integer number:

$$\text{error} = \sum_{n=1}^{\infty} a_n \sin(nN\theta) + b_n \cos(nN\theta)$$

For example, for k equal to 1 and N equal to 2, all orders of error can be corrected. In the general case, it is possible to average the errors of an order corresponding to n greater than or equal to k.

By proceeding in this way there is finally obtained from the measurement signal from the vibratory gyroscope a corrected signal in which there is filtered, by way of a high-frequency signal, the residual command signal linked to the scale factor that has caused its vibration geometrical position to turn as described above. From this corrected and filtered signal, it is advantageously possible to average the measurement errors relating to the vibration geometrical position of the vibratory gyroscope. Because of this, such errors can be cancelled out.

A second aspect of the present invention proposes a gyroscopic system including means adapted to implement a measurement method conforming to an embodiment of the present invention.

Such a gyroscopic system can include:
 a vibratory gyroscope, said gyroscope vibrating in an initial first vibration geometrical position and supplying a measurement signal;
 a command unit adapted to apply a periodic command signal over a time period adapted:
  to cause the vibration geometrical position to turn a first way during one part of the time period, causing a change in accordance with a first speed profile of the position of the vibration of said gyroscope from the first vibration geometrical position to a second vibration geometrical position; and to cause the vibration geometrical position to turn a second way opposite the first way during the other part of the time period, causing a change in accordance with a second speed profile of the position of the vibration of said gyroscope from the second vibration geometrical position to the first vibration geometrical position;

said command signal having a zero average over said time period and the first and second speed profiles indicating a speed variation of the change of vibration geometrical position as a function of time; and a processing unit adapted to supply a corrected signal representing a variation of vibration geometrical position values obtained by subtracting the command signal from the measurement signal supplied by the vibratory gyroscope.

The second speed profile can be the reverse of the first speed profile as a function of time.

It can further include a calculation unit at the output of the processing unit adapted to supply gyroscopic measurements corresponding to angular speed values, each angular speed value resulting from the division of a difference between two vibration geometrical position values of the corrected signal separated by an integer number of time periods by a time value corresponding to the integer number of time periods.

It can also include a low-pass filter at the output of the processing unit adapted to filter high-frequency components of the corrected signal.

In this gyroscopic system, the period and constant speed of the command signal can be determined so that the first and second vibration geometrical positions of the vibratory gyroscope are separated by $2\pi/kN$ radians, where N is a frequency mode of vibration of the vibratory gyroscope, and where k is a positive integer number determined as a function of the order of the errors to be corrected.

BRIEF DESCRIPTION OF THE DRAWINGS

Other features and advantages of the invention will become clearer on reading the following description. This is purely illustrative and must be read with reference to the appended drawings, in which:

FIG. 1-B shows the principal steps of a method of measurement by a gyroscopic system conforming to one embodiment of the present invention;

FIG. 1-C shows first and second speed profiles as a function of time of one embodiment of the present invention;

FIG. 2-B shows a corrected signal and a filtered corrected signal conforming to one embodiment of the present invention;

DETAILED DESCRIPTION OF THE DISCLOSURE

Figure 1A:
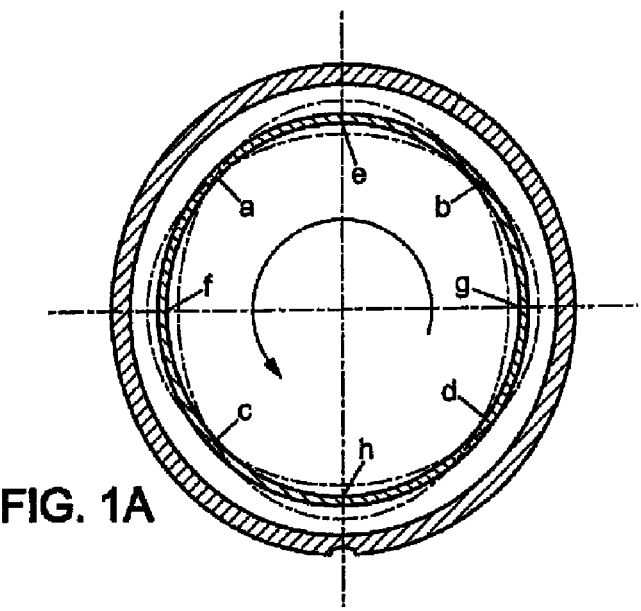
FIG. 1-A shows a vibration geometrical position of a vibratory gyroscope.
Figure 1B:
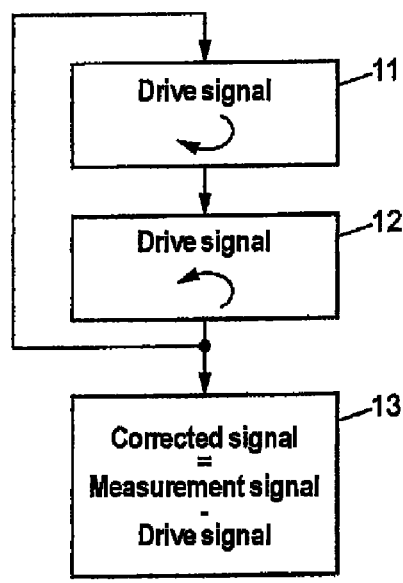
Figure 1C:
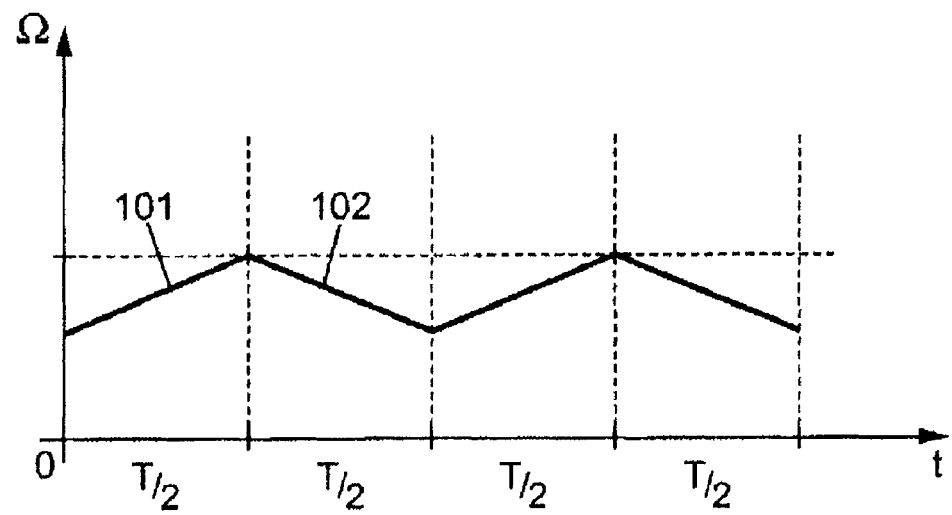

FIG. 1 shows the principal steps of a measurement method conforming to one embodiment of the present invention.

In a step 11, a periodic command signal adapted to cause the vibration geometric position to turn a first way is applied during part of the period of the periodic command signal. With this command signal applied, the vibration geometric position of the vibratory gyroscope turns a first way at a speed that can vary as a function of time according to a particular first profile. Thus the vibratory gyroscope moves from a first vibration geometrical position to a second vibration geometrical position. This first speed profile can equally correspond to a constant speed, in which case the vibration geometric position varies in a continuous manner over the part of the time period concerned.

Then, in a step 12, a command signal is applied that is adapted to cause the vibration geometrical position to turn a second way opposite the first way during the other time period of the command signal. Here the command signal causes a change in the vibration position of the gyroscope from the second vibration geometrical position to the first vibration geometrical position, this change being effected at a speed that can be variable as a function of time according to a second speed profile. The command signal has a zero mean value over the period of the periodic command signal.

In one embodiment the second speed profile is the first speed profile reversed as a function of time. Thus the first and second speed profiles are symmetrical with respect to each other about the centre of the time period.

The vibratory gyroscope is therefore then in the initial vibration geometrical position, i.e. the first vibration geometrical position, after the step 12.

Note that in one embodiment of the present invention the first and second speed profiles indicate a constant speed as a function of time, therefore with zero variation, i.e. the vibration position turns at constant speed both the first way and the second way.

This command signal is therefore a periodic precession signal adapted to apply an alternating precession to the vibratory gyroscope.

The steps 11 and 12 are then repeated to supply measurements from the vibratory gyroscope over a certain time period, when the gyroscope is processing.

In such a context, a measurement signal from the vibratory gyroscope can advantageously be available for different vibration geometrical positions. It then suffices to subtract from the measurement signal from the vibratory gyroscope the command signal applied to the vibratory gyroscope to obtain in a step 13 a corrected signal. By command signal is meant here a signal indicating a variation of angle values as a function of time. In this case, if the measurement signal from the gyroscope corresponds to angle values the subtraction operation can be applied to the signal directly and if the measurement signal corresponds to angular speed values there is provision for determining the command signal as a whole in order to obtain the command signal in the form of angle values and to be able to subtract it from the measurement signal.

Note that step 13 can be executed continuously while the steps 11 and 12 are effected successively.

The measurements supplied by the gyroscopic system can then be based on the corrected signal which represents a variation of values of the vibration geometric position of the gyroscope and is obtained by subtracting the command signal from the measurement signal supplied by the gyroscope during the execution of the steps 11 and 12.

FIG. 1-C shows first and second speed profiles in one embodiment of the present invention. FIG. 1-C shows the command signal as a function of time, i.e. the variation of the angular speed $\Omega$ as a function of time. Here, the angular speed corresponding to the command signal for changing the vibration geometrical position of the gyroscope continuously increases over the first part of the period of the command signal and decreases, in the same way as it increased, symmetrically, over the second part of the period of the command signal. Thus the part 101 illustrates the first speed profile and the part 102 illustrates the second speed profile, these two speed profiles being temporarily reversed one relative to the other.

Hereinafter, for purposes of illustration only, the first and second speed profiles indicate a zero speed variation as a function of time, i.e. a constant speed value.

Figure 2A:
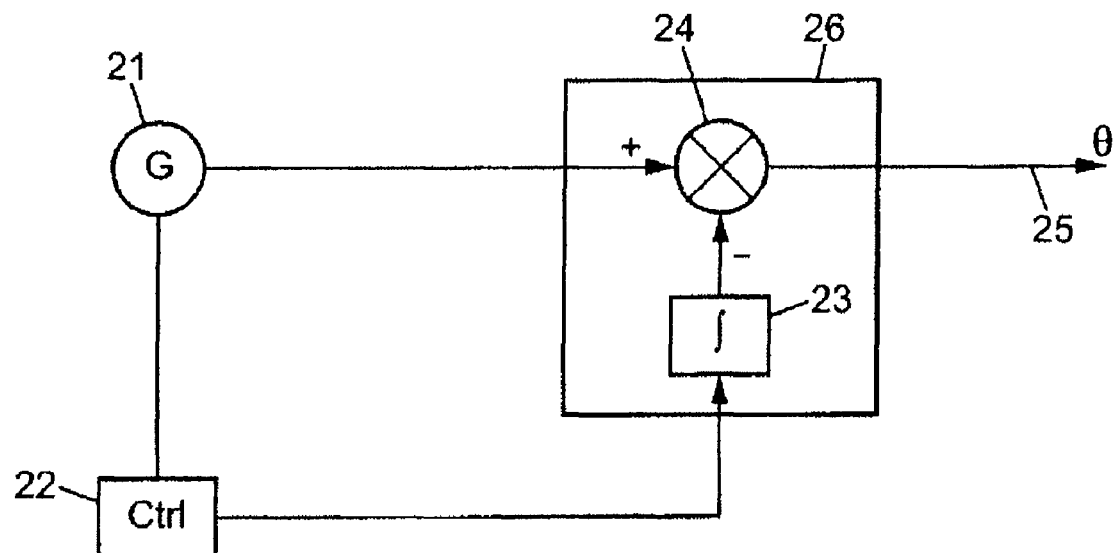
FIG. 2-A shows an architecture of a gyroscopic system conforming to one embodiment of the present invention.
Figure 2B:
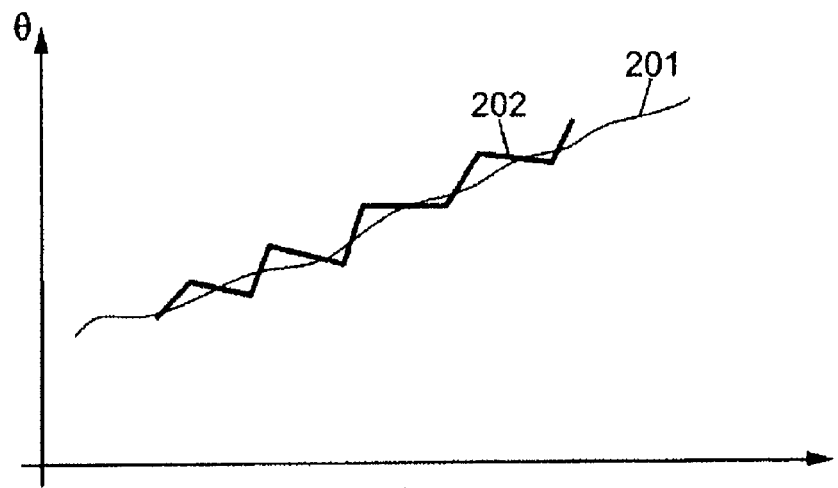

FIG. 2-A shows an architecture of a gyroscopic system including means adapted to implement a measuring method conforming to one embodiment of the present invention.

In one embodiment a gyroscopic system includes at least one vibratory gyroscope 21 adapted to receive and interpret command signals received from a command unit 22. Such a command unit 22 is adapted to send command signals in order to control a change of vibration geometric position of the gyroscope 21. To be more precise, such a command unit 22 generates a command signal to cause the vibration geometric position of the vibratory gyroscope to turn at a continuous angular speed from a first to a second vibration geometrical position.

Such a gyroscopic system further includes a processing unit 26 which receives on the one hand command signals from the command unit 22 and on the other hand a measurement signal from the gyroscope 21.

The processing unit 26 includes an integration unit 23 adapted to receive the command signal sent by the command unit 22, which indicates angle values, and to integrate those command signals.

This processing unit 26 further includes a signal subtractor 24 which receives on one side the measurement signal from the vibratory gyroscope 21 and on the other side the integrated command signal supplied by the integration unit 23, this processing unit 26 supplying at the output 25 a corrected signal. Note here that the corrected signal supplied at the output of the processing unit includes an error relating to the scale factor. Consequently, a residual signal linked to the command signal can still be present in the corrected signal, and because of this can reduce the performance of the gyroscopic measurements supplied by the gyroscopic system.

To circumvent this residual error relating to the scale factor, there can in particular be provision for applying the command signal over a time interval long enough for the residual signal to be considered as a high-frequency signal and thus filtered. In this case, after this time interval, filtering of the corrected signal can begin. Then, by continuing to apply the periodic command signal to the vibratory gyroscope, it is possible to supply high-performance gyroscopic measurements over a sliding time window corresponding at least to that time interval.

To this end, a low-pass filter can be included at the output 25 of the gyroscopic system shown in FIG. 2-A.

In one embodiment of the present invention, a corrected angular speed value signal can be supplied at the output 25, not an angle value signal as stated above. In this context, if the command signal indicates the angle values directly, the integration unit 23 is not required in the architecture.

Thus FIG. 2-B shows a corrected signal 202 supplied at the output 25 of the processing unit in which a residue of the triangular command signal is substantially visible. A filtered corrected signal 201 then corresponds to the output of the low-pass filter.

The filtered corrected signal 201 corresponds here to the signal for which the gyroscopic measurements of the gyroscopic system conforming to one embodiment of the present invention are supplied.

In applying filtering in this way, such a gyroscopic system can advantageously supply high-performance gyroscopic measurements even if the scale factor is not known.

Figure 3:
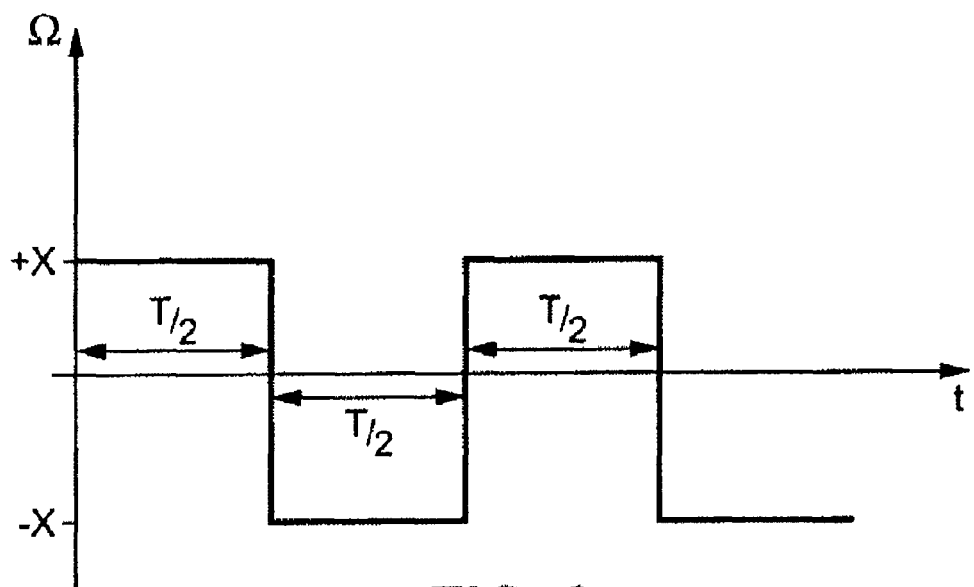
FIGS. 3 and 4 show a command signal and its integration in one embodiment of the present invention.

FIG. 3 shows a command signal in one embodiment of the present invention. This signal is shown in a frame of reference representing time on the abscissa axis and the commanded rotation speed of the vibration geometrical position of the vibratory gyroscope on the ordinate axis. Here the command signal is a rectangular signal representing the variations of the rotation speed applied to the vibratory gyroscope as a function of time. Here there is provision for applying a rotation speed $\Omega$ of a value X and −X alternately, respectively to consecutive parts T/2 of the time period. The rotation speed is therefore constant here over each of the parts T/2 of the time period and alternately positive and negative over two consecutive parts T/2 of the time period. A rotation speed $\Omega$ between 0.5 degrees per second and 20 degrees per second can be applied, for example.

Note here that in the embodiment in which the command signal is filtered, the shorter the periodicity of the command signal, the faster it is possible for the gyroscopic system to supply a corrected signal and thus high-performance measurements.

The command signal as shown in FIG. 3 is applied both to the vibratory gyroscope 21 and to the processing entity 26.

Figure 4:
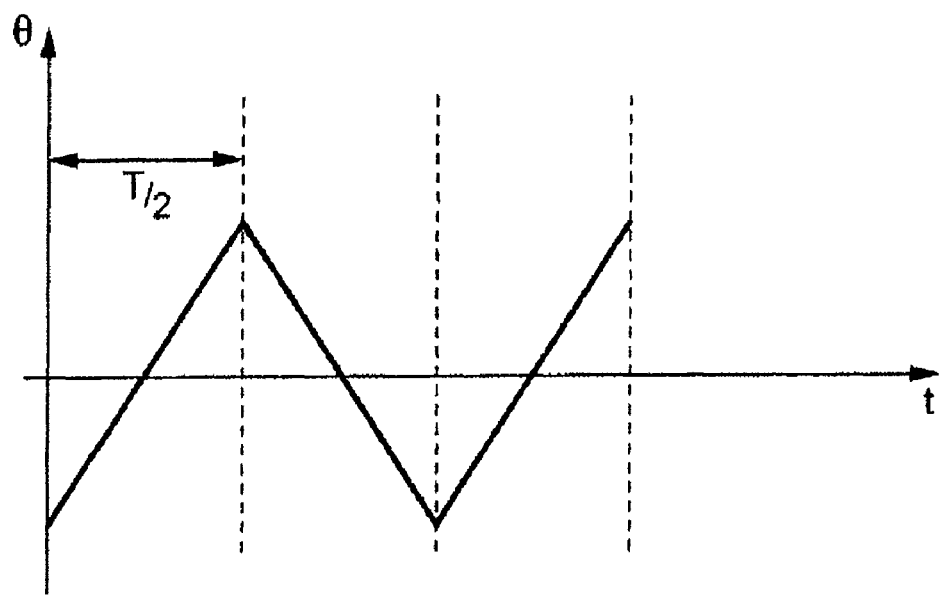

On reception of the command signal in the processing entity 26, the command signal, corresponding to the angular speed value, is first integrated. Thus, in one embodiment of the present invention, the integral of the command signal as shown in FIG. 3 is supplied at the output of the integration unit 23 in the form of a signal as shown in FIG. 4.

This signal is a periodic triangular signal of period 2T representing the variation of the vibration geometrical position of the vibratory gyroscope 21 as a function of time.

By commanding a uniform change to the vibration position over an angle of $2\pi/kN$ radians, it is possible to average the errors in the measurement signal from the gyroscope in accordance with the following equation, which errors can be written in the form $\sin(nN\theta)$ or $\cos(nN\theta)$:

$$\int_{\theta_0}^{\theta_0+2\pi/kN} (a_n\sin(nN\theta) + b_n\cos(nN\theta)) \cdot d\theta$$

where N is the vibration frequency mode of the vibratory gyroscope;
where k is a positive integer number;
where n is an integer number corresponding to an order of error to be corrected; and
where $\theta_0$ is an initial vibration geometrical position of the vibratory gyroscope.

Note that the integer number k can be determined according to the order of the errors in the measurement signal from the vibratory gyroscope that are to be corrected. For a value of k equal to 1 and a vibratory gyroscope for which the frequency mode is equal to 2 (i.e. N=2), it is possible to average errors of any order relating to the vibration geometrical position of the gyroscope.

For k equal to 1 and for a vibratory gyroscope for which the frequency mode is equal to 2, i.e. for which N is equal to 2, the errors of order n greater than or equal to 1 are corrected according to the following equation:

$$\int_{\theta_0}^{\theta_0+\pi} (a_n\sin(2n\theta) + b_n\cos(2n\theta)) \cdot d\theta$$

N, the vibration frequency mode of a vibratory gyroscope, can for example be equal to 2 or equal to 3, as in the vibratory gyroscope described in the document U.S. Pat. No. 7,281,426, for example.

There can be provision for subtracting the residual command signal linked to the scale factor from the measurement signal by determining a difference between a first angular value measured at the beginning of the period of the command signal and a second angular value measured at the end of that period and dividing this difference by the value of the period.

There can be provision for taking into consideration two vibration geometrical positions occupied by the vibratory gyroscope at two times separated by one or more periods of the command signal. In this case, the difference between the two positions is then divided by the number of periods that separate these two vibration geometrical positions.

An angular speed value is therefore supplied here. This angular speed value is advantageously corrected for the error relative to the scale factor.

Figure 5:
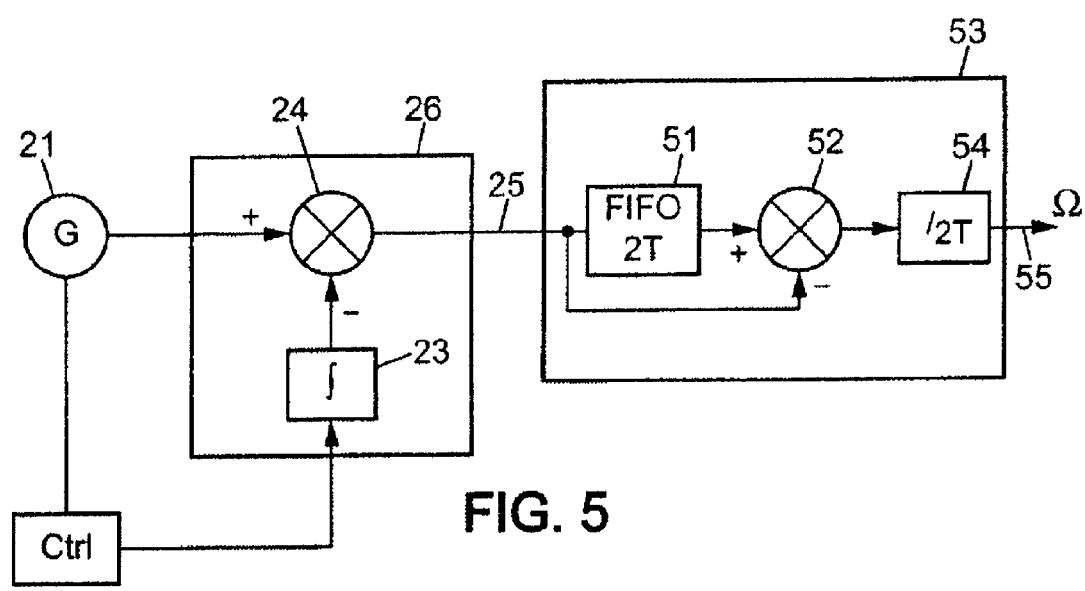
FIG. 5 shows an architecture of a gyroscopic signal in another embodiment of the present invention.

FIG. 5 shows an architecture of a gyroscopic system adapted to supply such angular speed values in one embodiment of the present invention.

The architecture shown is similar in part to that described with reference to FIG. 2-A with different output processing 25 but is equally intended to circumvent the residue of the command signal remaining in the corrected signal and linked to the scale factor. Here there is provision for processing the corrected signal at the output 25 of the processing unit 26 by a calculation unit 53 including an FIFO (First In First Out) 51. This FIFO 51 stores the angular values supplied at the output of the processing unit 26 for an integer number of periods of the command signal 2T.

Then, a subtractor 52 in cooperation with a divider 54 is able to apply the following equation to supply at the output 55 angular speed measurements that are corrected not only for errors relating to the vibration geometrical position of the vibratory gyroscope but also for errors linked to the scale factor:

$$\Omega = (\theta_{t+M\times 2T} - \theta_t)/M\times 2T$$

By establishing a difference over a period of M×2T, it is possible to cancel out the scale factor.

The invention claimed is:

1. A method of gyroscopic measurements supplied by a gyroscopic system including a vibratory gyroscope;
    said gyroscope vibrating in an initial first vibration geometrical position and supplying a measurement signal;
    wherein there is applied to the vibratory gyroscope over a period of time a periodic command signal adapted:
        to cause the vibration geometrical position to turn a first way, during one part of the time period, causing a change, in accordance with a first speed profile, of the position of the vibration of said gyroscope from the first vibration geometrical position to a second vibration geometrical position; and
        to cause the vibration geometrical position to turn a second way opposite the first way during the other part of the time period, causing a change in accordance with a second speed profile of the position of the vibration of said gyroscope from the second vibration geometrical position to the first vibration geometrical position;
    said command signal having a zero average over said time period, and the first and second speed profiles indicating a speed variation of the change of vibration geometrical position as a function of time; and
    wherein the measurements supplied by the gyroscopic system are based on a corrected signal representing a variation of vibration geometrical position values and obtained by subtracting the command signal from the measurement signal supplied by the gyroscope.

2. The method according to claim 1, wherein the second speed profile is the reverse of the first speed profile as a function of time.

3. The method according to claim 1, wherein the two parts of the time period are identical.

4. The method according to any of claim 1, wherein the measurement signal from the gyroscope and the command signal are expressed like the measurements supplied by the gyroscopic system either in angle values or in angular speed values.

5. The gyroscopic measurement method according to any of claim 1, wherein the measurements supplied by the gyroscopic system correspond to angular speed values, each angular speed value resulting from the division of a difference between two vibration geometrical position values of the corrected signal separated by an integer number of time periods by a time value corresponding to the integer number of time periods.

6. The gyroscopic measurement method according to any of claim 1, wherein the measurements supplied by the gyroscopic system are obtained by low-pass filtering of the corrected signal.

7. The gyroscopic measurement method according to claim 6, wherein, before supplying measurements effected by the gyroscopic system, the periodic signal is applied during a time interval sufficiently long to be able to consider the command signal as a high-frequency signal relative to the measurement signal from the vibratory gyroscope.

8. The gyroscopic measurement method according to claim 1 the time period and the first and second speed profiles of the command signal are determined so that the first and second vibration geometrical positions of the vibratory gyroscope are separated by $2\pi/kN$ radians,
    where N is a frequency mode of vibration of the vibratory gyroscope; and
    where k is a positive integer number determined as a function of the order of the errors to be corrected.

9. A gyroscopic system including:
    a vibratory gyroscope, said gyroscope vibrating in an initial first vibration geometrical position and supplying a measurement signal;
    a command unit adapted to apply a periodic command signal over a time period adapted:
        to cause the vibration geometrical position to turn a first way, during one part of the time period, causing a change in accordance with a first speed profile of the position of the vibration of said gyroscope from the first vibration geometrical position to a second vibration geometrical position; and
        to cause the vibration geometrical position to turn a second way opposite the first way during the other part of the time period, causing a change in accordance with a second speed profile of the position of the vibration of said gyroscope from the second vibration geometrical position to the first vibration geometrical position;
    said command signal having a zero average over said time period and the first and second speed profiles indicating a speed variation of the change of vibration geometrical position as a function of time; and
    a processing unit adapted to supply a corrected signal representing a variation of vibration geometrical position values obtained by subtracting the command signal from the measurement signal supplied by the vibratory gyroscope.

10. The gyroscopic system according to claim 9, wherein the second speed profile is the reverse of the first speed profile as a function of time.

11. The gyroscopic system according to claim 9, further including a calculation unit at the output of the processing unit adapted to supply gyroscopic measurements corresponding to angular speed values, each angular speed value resulting from the division of a difference between two vibration geometrical position values of the corrected signal separated by an integer number of time periods by a time value corresponding to the integer number of time periods.

12. The gyroscopic system according to claim 9, further including a low-pass filter at the output of the processing unit adapted to filter high-frequency components of the corrected signal.

13. The gyroscopic system according to any of claim 9, wherein the time period and the first and second speed profiles of the command signal are determined so that the first and second vibration geometrical positions of the vibratory gyroscope are separated by $2\pi/kN$ radians,
  where N is a frequency mode of vibration of the vibratory gyroscope, and
  where k is a positive integer number determined as a function of the order of the errors to be corrected.

* * * * *

UNITED STATES PATENT AND TRADEMARK OFFICE
CERTIFICATE OF CORRECTION

PATENT NO. : 8,342,024 B2
APPLICATION NO. : 12/581670
DATED : January 1, 2013
INVENTOR(S) : Christian Lignon and Arnaud Carré

It is certified that error appears in the above-identified patent and that said Letters Patent is hereby corrected as shown below:

Title Page, item (75) Inventors: should read: Christian Lignon, Paris (FR); Arnaud Carré, Paris (FR)

Signed and Sealed this
Fourteenth Day of May, 2013

Teresa Stanek Rea
*Acting Director of the United States Patent and Trademark Office*